(12) United States Patent
Wittenschlaeger et al.

(10) Patent No.: US 11,718,209 B2
(45) Date of Patent: Aug. 8, 2023

(54) ADJUSTABLE SUSPENDED SEAT APPARATUS HAVING TUNED FREQUENCY-TAILORED DAMPING THROUGH A STRATIFIED SEAT STRUCTURE

(71) Applicant: Fox Factory, Inc., Duluth, GA (US)

(72) Inventors: Thomas Wittenschlaeger, El Cajon, CA (US); Timothy King, El Cajon, CA (US); Mason Powers, El Cajon, CA (US); Jeffrey Hermann, El Cajon, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 17/551,194

(22) Filed: Dec. 15, 2021

(65) Prior Publication Data

US 2022/0105841 A1 Apr. 7, 2022

Related U.S. Application Data

(60) Continuation of application No. 17/021,762, filed on Sep. 15, 2020, now Pat. No. 11,241,984, which is a division of application No. 15/816,470, filed on Nov. 17, 2017, now Pat. No. 10,780,803.

(60) Provisional application No. 62/579,021, filed on Oct. 30, 2017, provisional application No. 62/565,944, filed on Sep. 29, 2017, provisional application No.
(Continued)

(51) Int. Cl.
*B60N 2/50* (2006.01)
*B60N 2/70* (2006.01)
*B60N 2/005* (2006.01)
*B60N 2/52* (2006.01)

(52) U.S. Cl.
CPC .............. *B60N 2/501* (2013.01); *B60N 2/005* (2013.01); *B60N 2/502* (2013.01); *B60N 2/525* (2013.01); *B60N 2/70* (2013.01)

(58) Field of Classification Search
CPC ........ B60N 2/501; B60N 2/005; B60N 2/502; B60N 2/70
See application file for complete search history.

(56) References Cited

U.S. PATENT DOCUMENTS 3,833,259 A * 9/1974 Pershing .................. B60N 2/70
297/252
5,269,590 A * 12/1993 Carilli .................. B60N 2/7035
297/216.1
10,780,803 B2 9/2020 Wittenschlaeger et al.
(Continued)

*Primary Examiner* — Gary C Hoge

(57) ABSTRACT

An adjustable suspended seat apparatus having a tuned frequency-tailored damping through stratified seat structure is described. The damping seat structure includes: a first material of a plurality of materials having a first characteristic to provide a first damping effect in a first layer. A second material of the plurality of materials based on a second characteristic to provide a second damping effect in a second layer, the first material or the second material having an adjustable damping characteristic. The suspended seat apparatus includes a seat base configured to have the seat coupled thereto; a suspension system coupled to the seat base, the suspension system comprising: an adjustment feature configured to adjust operation of the suspension system; and a chassis mount coupled to the suspension system, the chassis mount configured to be coupled to a vehicle.

8 Claims, 11 Drawing Sheets

Related U.S. Application Data

62/547,660, filed on Aug. 18, 2017, provisional application No. 62/423,399, filed on Nov. 17, 2016.

(56) References Cited

U.S. PATENT DOCUMENTS

| | | | | |
|---|---|---|---|---|
| 2006/0273650 | A1* | 12/2006 | Embach | B60N 2/70 |
| | | | | 297/452.27 |
| 2014/0252838 | A1* | 9/2014 | Sanefuji | A47C 27/15 |
| | | | | 297/452.48 |
| 2015/0232053 | A1* | 8/2015 | Cormier | B60N 2/42 |
| | | | | 280/751 |
| 2016/0121769 | A1* | 5/2016 | Kumagai | B60N 2/5825 |
| | | | | 297/452.61 |
| 2018/0134192 | A1 | 5/2018 | Wittenschlaeger et al. | |

* cited by examiner

ADJUSTABLE SUSPENDED SEAT APPARATUS HAVING TUNED FREQUENCY-TAILORED DAMPING THROUGH A STRATIFIED SEAT STRUCTURE

CROSS-REFERENCE

This application is a Continuation and claims priority to and benefit of U.S. patent application Ser. No. 17/021,762 filed on Sep. 15, 2020, entitled "ADJUSTABLE SUSPENDED SEAT APPARATUS HAVING TUNED FREQUENCY-TAILORED DAMPING THROUGH A STRATIFIED SEAT STRUCTURE" by Thomas Wittenschlaeger et al., having and assigned to the assignee of the present application the disclosure of which is hereby incorporated herein by reference in its entirety.

The application with Ser. No. 17/021,762 is a Divisional and claims priority to and benefit of U.S. patent application Ser. No. 15/816,470 filed on Nov. 17, 2017, now U.S. Issued U.S. Pat. No. 10,780,803, entitled "ADJUSTABLE SUSPENDED SEAT APPARATUS HAVING TUNED FREQUENCY-TAILORED DAMPING THROUGH A STRATIFIED SEAT STRUCTURE" by Thomas Wittenschlaeger et al., having and assigned to the assignee of the present application the disclosure of which is hereby incorporated herein by reference in its entirety.

The application with Ser. No. 15/816,470 claims priority to and benefit of U.S. Provisional Patent Application No. 62/579,021 filed on Oct. 30, 2017, entitled "Adjustable Suspended Seat Apparatus Having Tuned Frequency-Tailored Damping Through A Stratified Seat Structure" by Thomas Wittenschlaeger et al., having and assigned to the assignee of the present application the disclosure of which is hereby incorporated herein by reference in its entirety.

The application with Ser. No. 15/816,470 claims priority to and benefit of U.S. Provisional Patent Application No. 62/565,944 filed on Sep. 29, 2017, entitled "Adjustable Suspended Seat Apparatus Having Tuned Frequency-Tailored Damping Through A Stratified Seat Structure" by Thomas Wittenschlaeger et al., having and assigned to the assignee of the present application the disclosure of which is hereby incorporated herein by reference in its entirety.

The application with Ser. No. 15/816,470 claims priority to and benefit of U.S. Provisional Patent Application No. 62/547,660 filed on Aug. 18, 2017, entitled "Suspended Seat Base" by Thomas Wittenschlaeger et al., having and assigned to the assignee of the present application the disclosure of which is hereby incorporated herein by reference in its entirety.

The application with Ser. No. 15/816,470 claims priority to and benefit of U.S. Provisional Patent Application No. 62/423,399 filed on Nov. 17, 2016, entitled "Tuned Frequency-Tailored Damping Through Stratified Seat Structures" by Thomas Wittenschlaeger, having and assigned to the assignee of the present application the disclosure of which is hereby incorporated herein by reference in its entirety.

FIELD OF THE INVENTION

Embodiments of the present technology relate generally to damping systems having stratified layers of viscoelastic materials used in a suspended seat environment, the combination of which dissipate excitation frequencies individually and jointly.

BACKGROUND

Traditional shock absorbers embody damping characteristics that are "tuned" through a combination of piston design, outer body flow design and shim stacks on the piston and damper inner body which work together to create a highly tailored damping characteristics. However, in almost every vehicle some amount of shock and vibration is passed through to the driver or passengers therein. As such, there is a need for vibration and shock damping at the passenger level.

BRIEF DESCRIPTION OF THE DRAWINGS

Aspects of the present invention are illustrated by way of example, and not by way of limitation, in the accompanying drawings, wherein.

Figure 1:
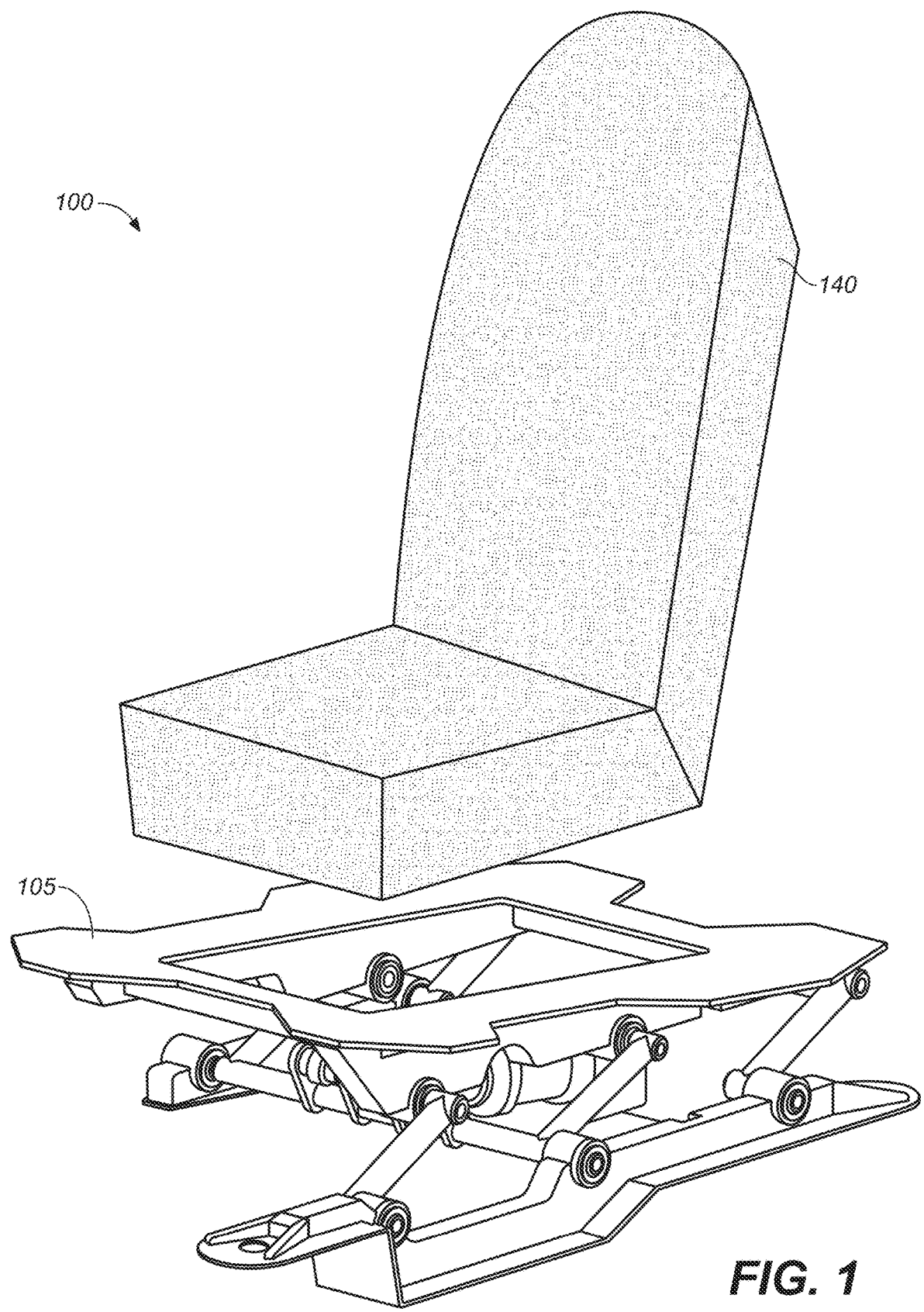
FIG. 1 is a perspective view of a suspended seat apparatus coupled with a tuned frequency-tailored damping through a stratified seat structure, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Overview of Discussion

This patent application describes the invention in the context of an example embodiment of a seat for a driver, passenger including one or more of front and rear layouts. In general, by adding the damping seat structure to the adjustable suspended seat apparatus, a number of improvements are achieved. For example, it is well-known that there are dangers involved with suspended seat arrangements. If the suspended seat is used in an otherwise harsh ride, if the suspension portion of the suspended seat is maxed out, back damage could occur. Specifically, the human spine is the next receiver of the remaining undamped shock after the vehicle suspension and seat suspension are maxed. By incorporating a damping seat structure into the adjustable suspended seat apparatus, the addition of the damping layers, as described herein, will provide another layer of protection between the remaining undamped shock and the human spine.

Moreover, since the damping characteristics of both the damping seat structure and the adjustable suspended seat apparatus are adjustable, the combination of the two disparate systems will allow additional manual, automatic, factory set, and real time tuning that will provide situational improvement across the gamut. For example, a smoother ride, reduced fatigue over a long period of driving or riding, additional safety enhancements to provide near-real time adjustments to allow the maximum shock absorption to protect the human spine. Additionally, the combination of adjustable suspended seat apparatus and damping seat structure as discussed herein will be manually adjusted, automatically adjusted, or a combination of manual and automatic adjustment.

Thus, the different components of the adjustable suspended seat apparatus having tuned frequency-tailored damping through a stratified seat structure will be singularly or jointly adjusted based on user preference, terrain, vehicle type, driver characteristics (e.g., height, weight, etc.), real-time feedback, vehicle input, visual recognition, event detection (e.g., pothole, bump, road surface, etc.) suspension status, and the like.

Further, in one embodiment, the different components of the adjustable suspended seat apparatus having tuned frequency-tailored damping through a stratified seat structure will be tuned such that the damping seat structure absorbs a first frequency vibration while the adjustable suspended seat apparatus absorbs a second frequency of vibration (different than the first frequency vibration) to increase the absorbed frequency spectrum.

In another embodiment, the different components of the adjustable suspended seat apparatus having tuned frequency-tailored damping through a stratified seat structure will be tuned such that the damping seat structure absorbs a first frequency vibration while the adjustable suspended seat apparatus absorbs a second frequency of vibration (that overlaps with the first frequency of vibration) to increase the vibration absorbed at a certain frequency on the spectrum.

In another embodiment, the different components of the adjustable suspended seat apparatus having tuned frequency-tailored damping through a stratified seat structure will be tuned such that the damping seat structure absorbs a first frequency vibration while the adjustable suspended seat apparatus also absorbs the first frequency of vibration to increase the vibration absorbed at the first frequency.

The following discussion will begin with a brief description of vehicle seat shock and vibration characteristics and the problems associated therewith. The discussion then turns to a description of various embodiments, which address and overcome the present state of seat suspension shortcomings.

Embodiments described herein utilize varying layers of viscoelastic materials in a "virtual shim stack" to create the ability to precision tune a damping characteristic of a seat structure to the precise nature of the expected force or excitation vector.

Referring now to FIG. 1, a perspective view of a suspended seat apparatus 105 having tuned frequency-tailored damping through a stratified seat 140, referred to hereinafter as suspended seat apparatus with damping seat structure 100, is shown in accordance with an embodiment. Suspended seat apparatus with damping seat structure 100 includes a seat 140 and a suspended seat apparatus 105. Although suspended seat apparatus with damping seat structure 100 resembles an automobile seat, it should be appreciated that the technology is well suited for application in other vehicles such as snowmobiles, off-road vehicles, on-road vehicles, boats, motorcycles, and the like in which a need for additional torsion and vibration damping exists.

In general, every seating system experiences external and internal excitations from a plurality of forces that produce shock and vibration of varying amplitude and varying natural frequency that are transmitted to the seat from the vehicle to which the seat is coupled. Over time, these physical shocks will cause fatigue, disorientation, illness, injury, and the like.

Suspended seat apparatus 105 is broken down into its components in FIGS. 2-12. In general, suspended seat apparatus 105 includes a seat base 110 that provides a solid attachment point of the original seat 140 to the system; a chassis mount 111 that provides a solid attachment point of the system to the vehicle body pan; a shock absorber 114 with integrated air spring that migrates shock forces from vehicle movement to the seat occupant; a cantilever assembly 112 that translates vertical motion to horizontal motion; and a series of pivot arm links 113 that provide support for the seat base 110 to the chassis mount 111.

Suspended seat apparatus 105 includes a number of important features. For example, true hydraulic shock damping allows for controlled rebound/compression damping directly at the seat 140, reducing ride fatigue and injury risk to the occupant. The hydraulic shock absorber 114 will be locked out by the occupant using the lock out switch 120 to mimic a rigid seat base during on-road conditions, and then opened up to full suspension during off-road conditions.

When paired with an integrated air compressor and controller automatic adjuster 125, the FOX suspended seat apparatus 105 will be self-leveling, automatically adjusting seat height to the occupant's weight. Further, the FOX suspended seat apparatus 105 will include semi-active, or full active tuning for compression/rebound, and adjustability via smart phone app connected via wireless/Bluetooth interface.

As described herein, the suspended seat apparatus with damping seat structure 100 will be used in truck, SUV, offroad vehicle industry, UTV, powersports, heavy trucking, RV, agriculture, maritime, and the like.

In one embodiment, suspended seat apparatus 105 converts vertical motion into horizontal motion using a cantilever design. This vertical motion might be a 1:1 ratio; meaning for every 1 unit of vertical travel, 1 equal unit of horizontal travel is converted. This ratio will be infinitely adjusted using different cantilever lengths/ratios/shock positions. Moreover, as shown in FIG. 1, the system operates as a traditional 4 bar "parallelogram" mechanism which is mirrored to each side of the seat base.

Figure 2:
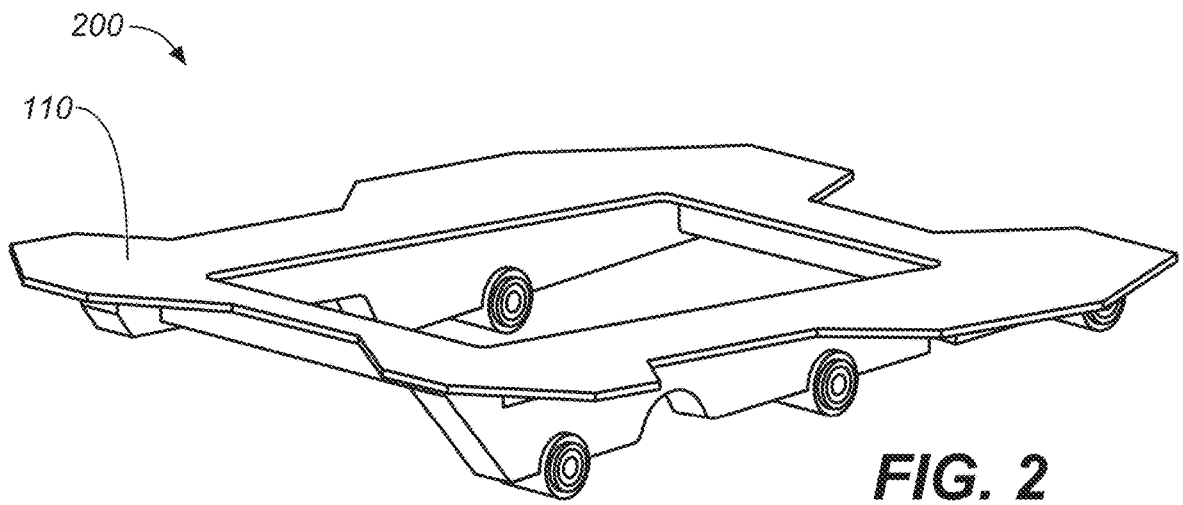
FIG. 2 is a perspective view of a seat base component of the suspended seat apparatus, in accordance with an embodiment.

Referring now to FIG. 2, a perspective view 200 of a seat base 110 portion of the suspended seat apparatus 105 is shown in accordance with an embodiment. In one embodiment, seat base 110 is the point where seat 140 is mounted to suspended seat apparatus 105 to form the suspended seat apparatus with damping seat structure 100.

Figure 3:
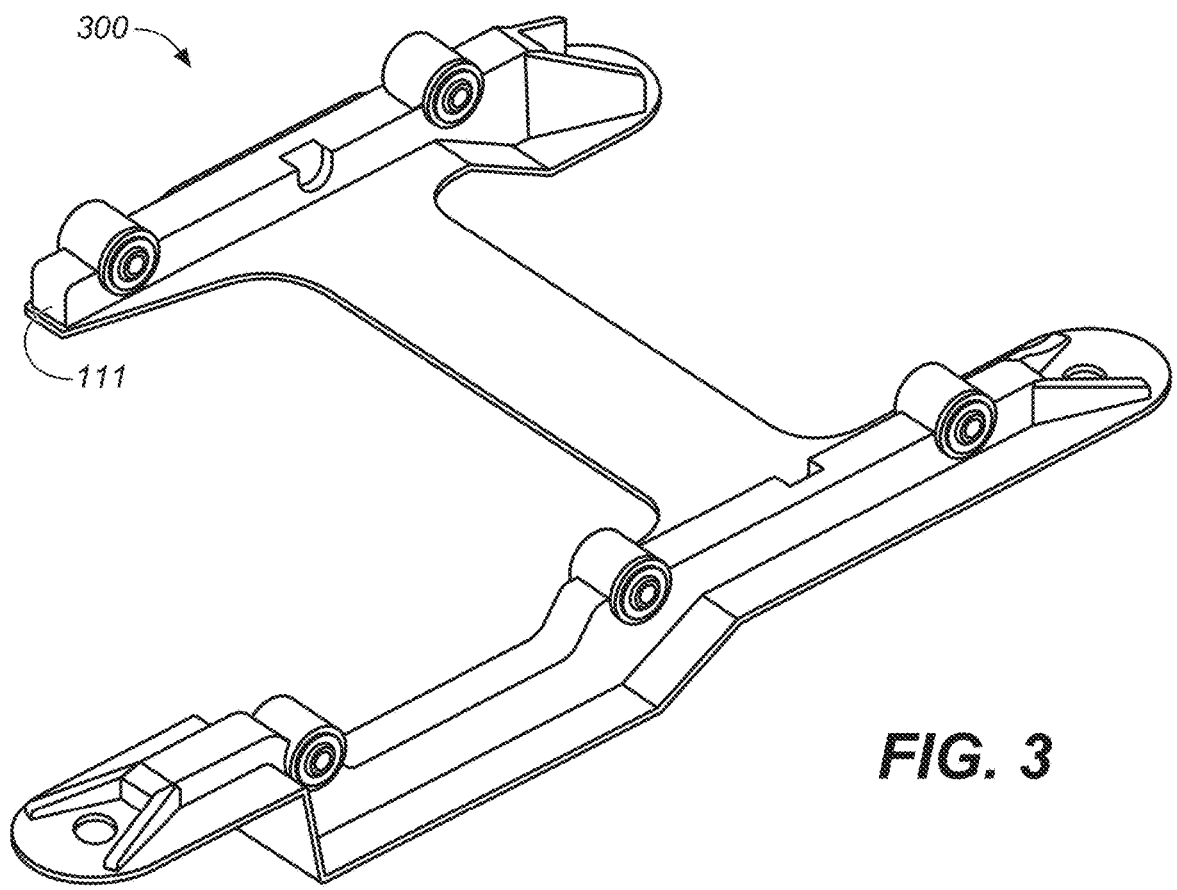
FIG. 3 is a perspective view of a chassis mount component of the suspended seat apparatus, in accordance with an embodiment.

With reference now to FIG. 3, a perspective view 300 of a chassis mount 111 portion of the suspended seat apparatus 105 is shown in accordance with an embodiment. In one embodiment, chassis mount 111 is a bracket that attaches the suspended seat apparatus with damping seat structure 100 to the chassis of a vehicle using added bolt holes or existing bolt holes. In one embodiment, chassis mount 111 is specific to each vehicle configuration to ensure safe and conforming fitment.

Figure 4:
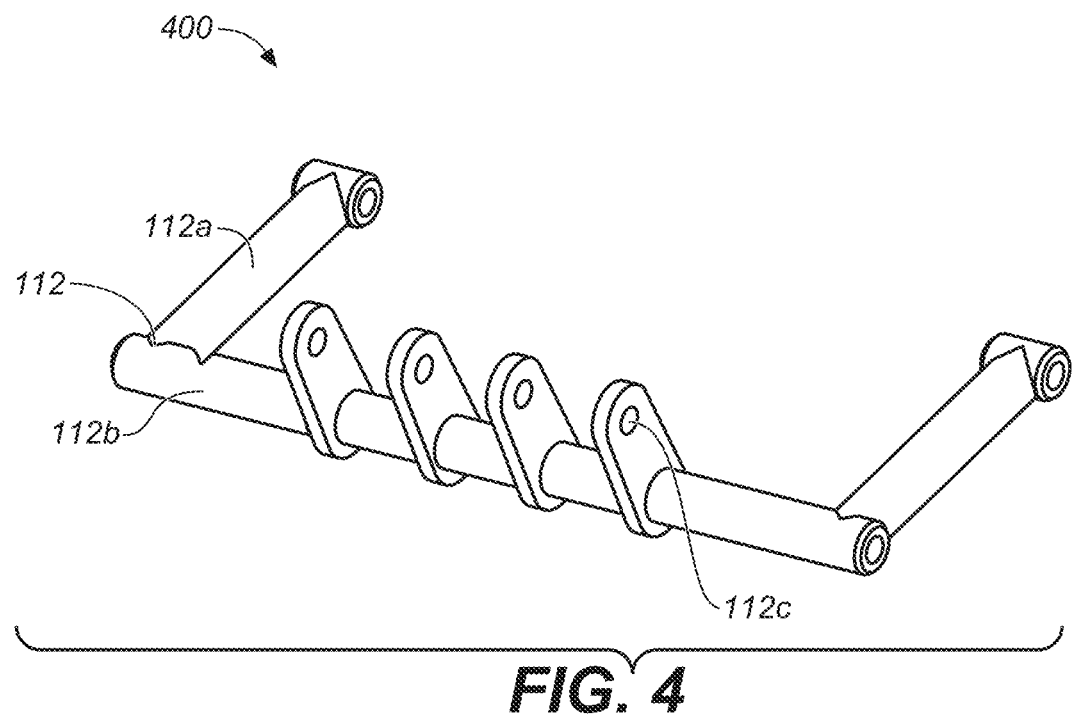
FIG. 4 is a perspective view of a cantilever component of the suspended seat apparatus, in accordance with an embodiment.

Referring now to FIG. 4, a perspective view 400 of a cantilever 112 portion of the suspended seat apparatus 105 is shown in accordance with an embodiment. In one embodiment, cantilever assembly 112 includes 2 lever pivot links 112a attached at both ends of a rigid bar 112b. The rigid bar 112b has a series of cantilever arms 112c (e.g., part of cantilever assembly 112) attached to it. As seat base 110 moves vertically, cantilever assembly 112 rotates and compresses shock absorber 114.

Figure 5:
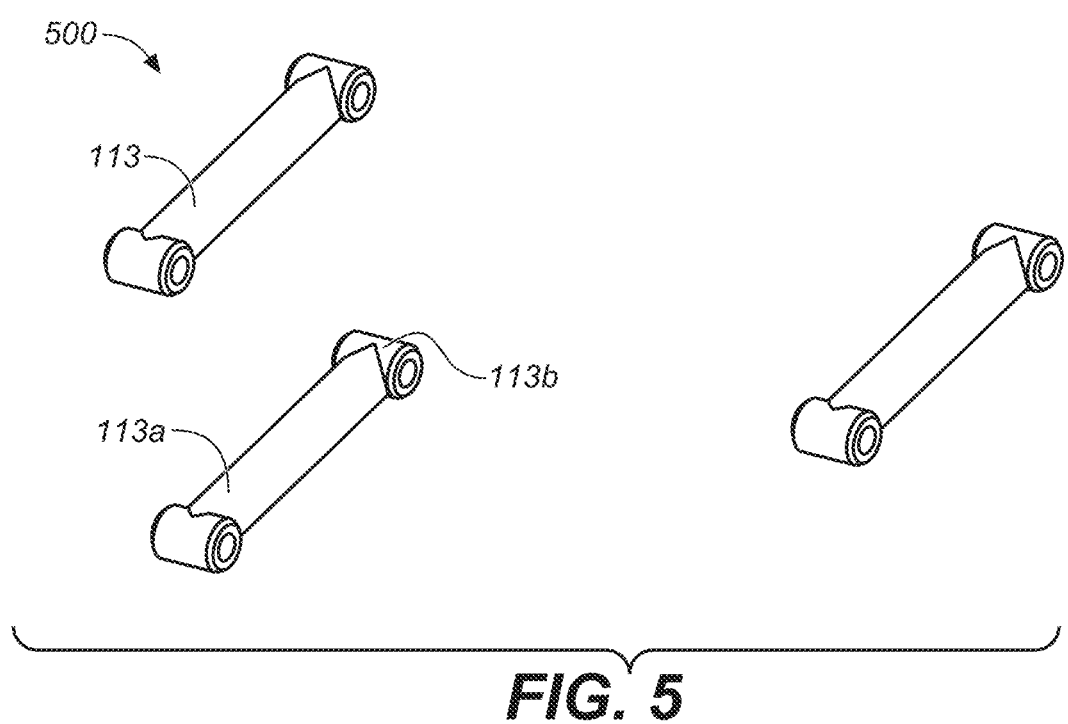
FIG. 5 is a perspective view of a plurality of pivot arm links of the suspended seat apparatus, in accordance with an embodiment.

With reference now to FIG. 5, a perspective view 500 of a plurality of pivot arm links 113 of the suspended seat apparatus 105 is shown in accordance with an embodiment. In one embodiment, pivot arm links 113 provide seat base 110 supports. As seat base 110 increases in length, pivot arm links 113 are added for support. One end of pivot arm links 113 is attached to seat base 110 via a shaft and roller bearing 113b and the other end of pivot arm links 113 are attached to chassis mount 111 via a shaft and roller bearing assembly 113a.

Figure 6:
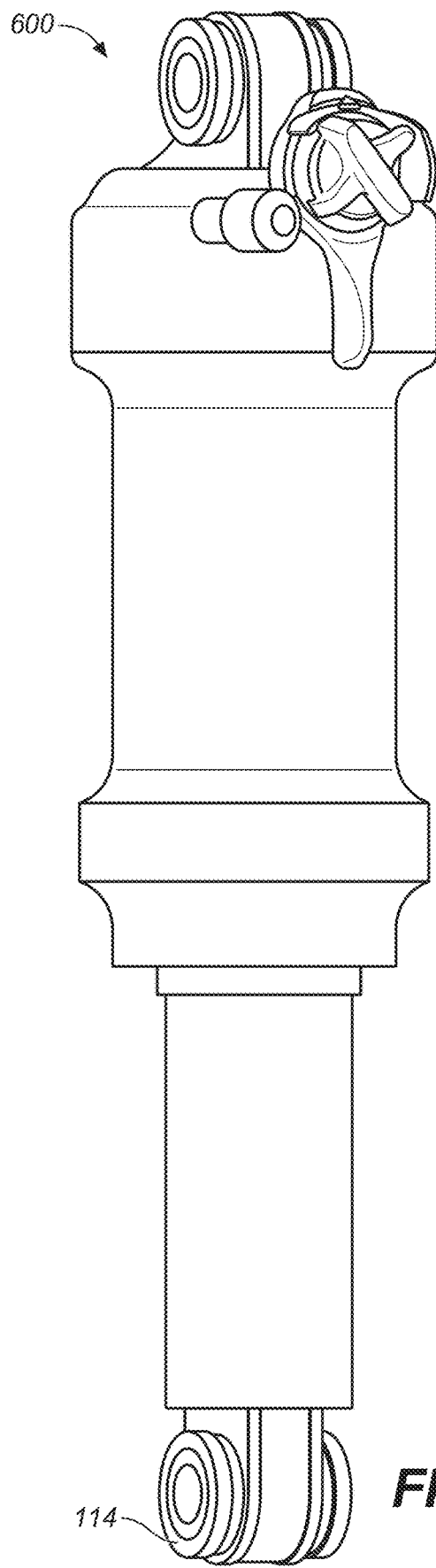
FIG. 6 is a perspective view of a shock absorber component of the suspended seat apparatus, in accordance with an embodiment.

Referring now to FIG. 6, a perspective view 600 of a shock absorber 114 portion of the suspended seat apparatus 105 is shown in accordance with an embodiment. In one embodiment, shock absorber 114 includes an integrated air spring and damper. For example, the air spring has a dual piston design with an integrated negative spring to aid in creating a more linear air spring curve. In one embodiment, the air spring has a built in damper that is fully adjustable.

Figure 7:
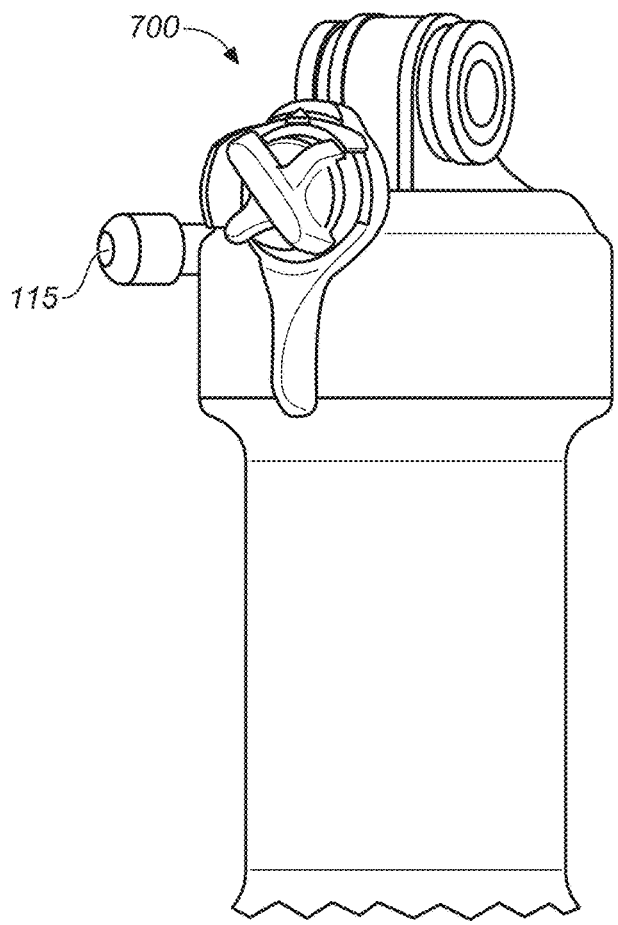
FIG. 7 is a perspective view of an adjustment knob on the shock absorber component of the suspended seat apparatus, in accordance with an embodiment.

With reference now to FIG. 7, a perspective view 700 of an adjustment knob 115 on the shock absorber 114 portion of the suspended seat apparatus 105 is shown in accordance with an embodiment. In one embodiment, the primary damping components are fully adjustable air shocks that will be manually or automatically adjusted. For example, the shock may be manually adjusted via adjustment knob 115. The adjustments are shown in FIGS. 8 and 9.

Figure 8:
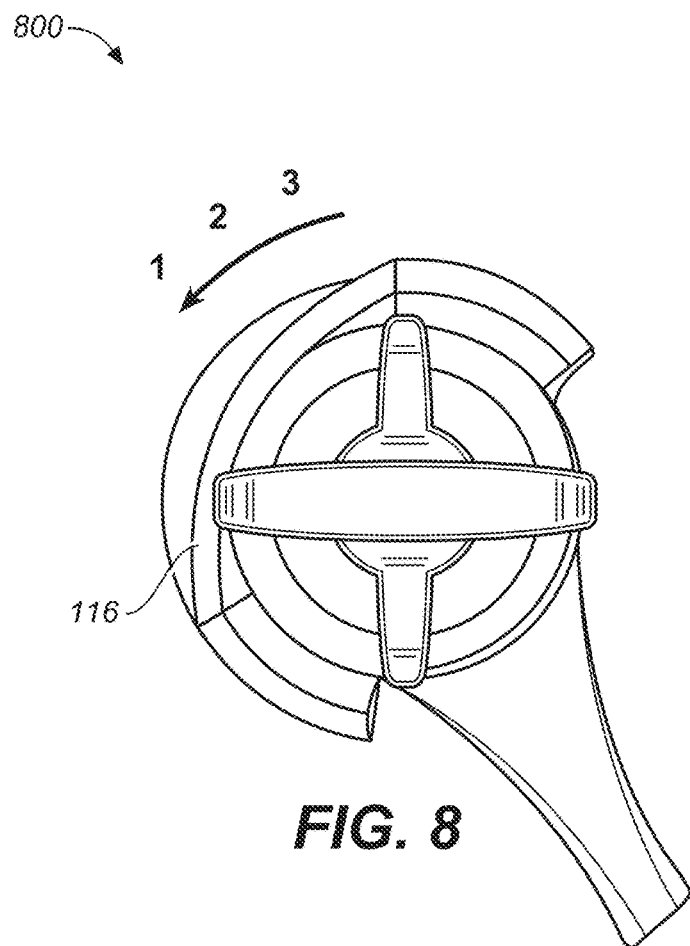
FIG. 8 is a front view of a low speed compression adjust on the shock absorber component of the suspended seat apparatus, in accordance with an embodiment.
Figure 9:
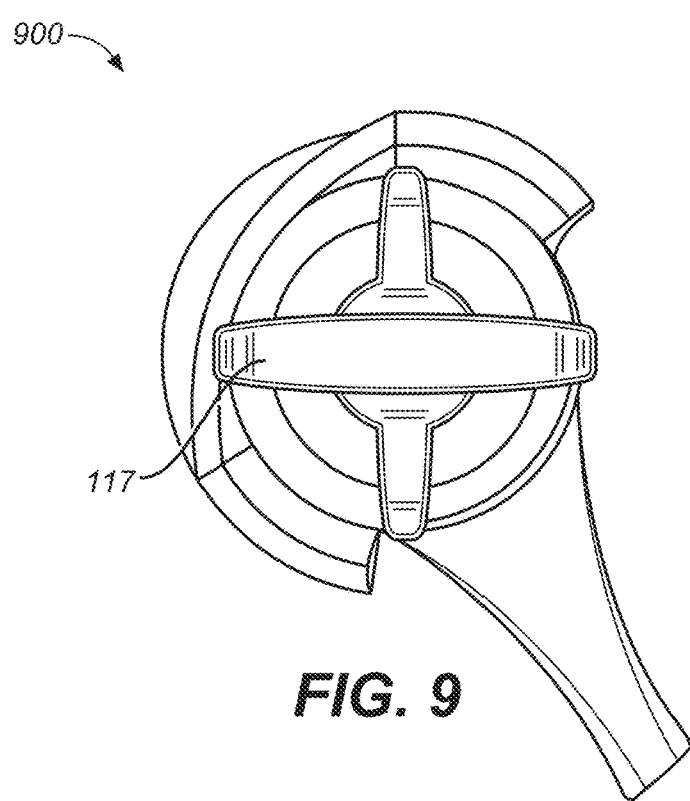
FIG. 9 is a front view of a rebound adjust on the shock absorber component of the suspended seat apparatus, in accordance with an embodiment.

Referring now to FIG. 8, a front view 800 of a low speed compression adjust 116 on the shock absorber 114 portion of the suspended seat apparatus 105 is shown in accordance with an embodiment. In one embodiment, With reference now to FIG. 9, a front view 900 of a rebound adjust 117 on the shock absorber 114 portion of the suspended seat apparatus 105 is shown in accordance with an embodiment. Referring again to FIG. 6, in one embodiment the primary spring used in shock absorber 114 is range adjustable air spring from 0-300 psi. Although a range is described, it should be appreciated that in other embodiments, there may be other primary springs, other than adjustable air springs, and adjustable to other ranges. However, in one embodiment, the primary spring used in shock absorber 114 is range adjustable air spring from 0-300 psi. In one embodiment, the air pressure will be adjusted using a high pressure hand pump or air compressor.

Figure 10:
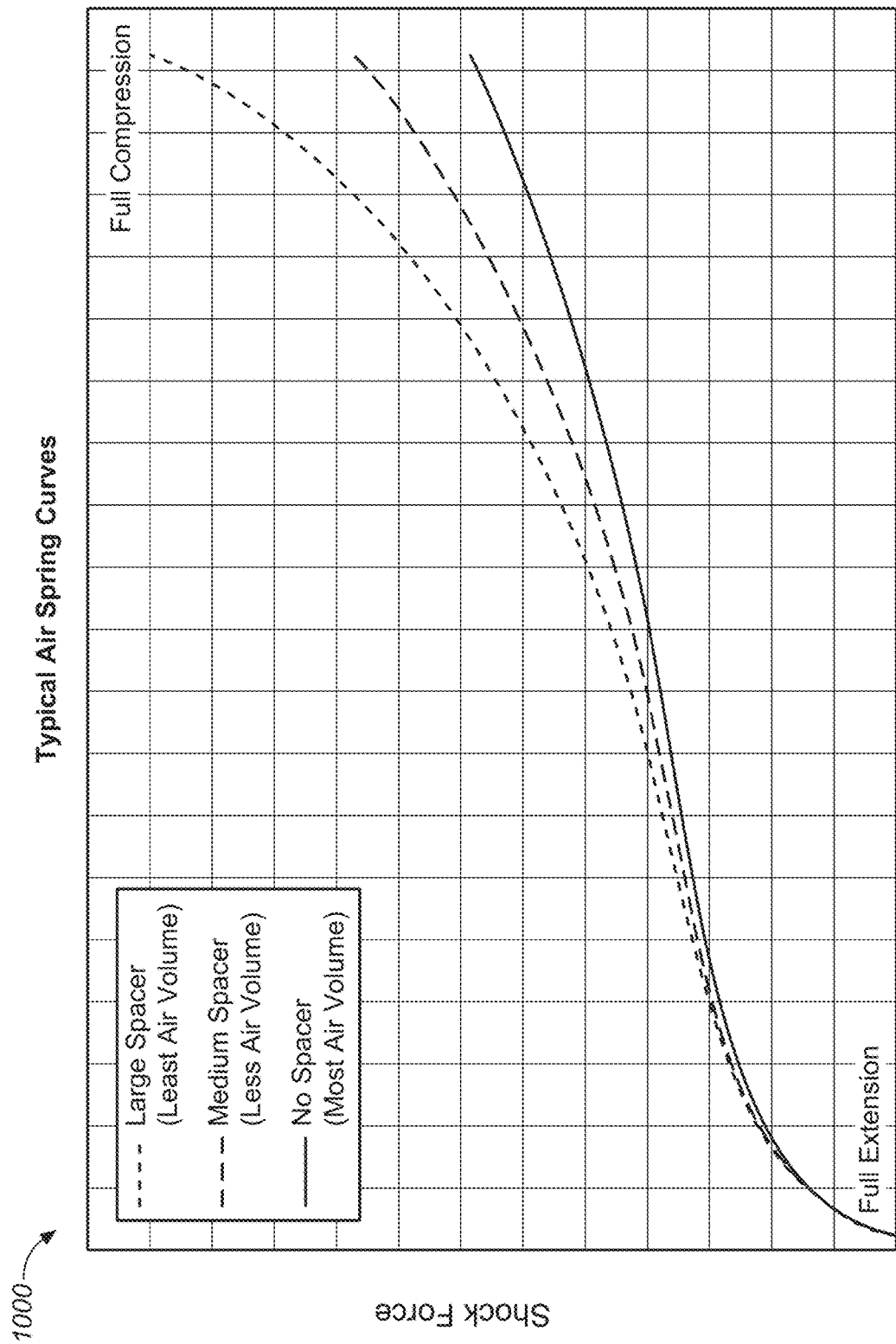
FIG. 10 is a graphical view of a plurality of typical air spring curves for the suspended seat apparatus, in accordance with an embodiment.

Referring now to FIG. 10, a graphical view 1000 of a plurality of typical air spring curves for the suspended seat apparatus 105 is shown in accordance with an embodiment. In one embodiment, since the spring used is an air spring, additional compression spacers will be added to increase the compression ratio in the spring which changes the compression curve of the spring as shown in the graphical view 1000.

Figure 11:
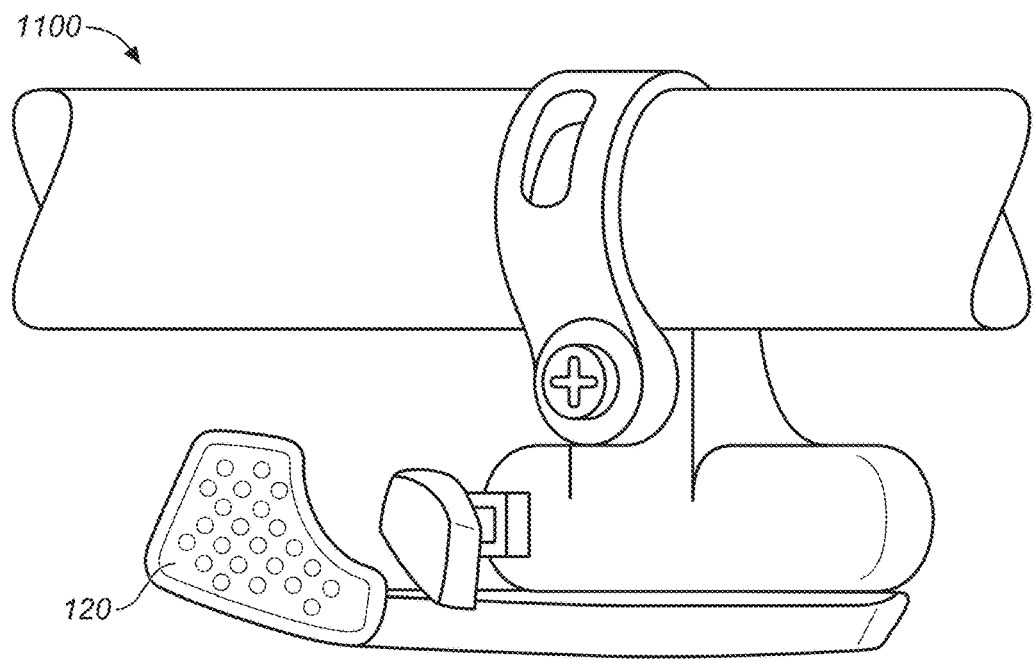
FIG. 11 is a perspective view of a position lockout switch for the suspended seat apparatus, in accordance with an embodiment.

With reference now to FIG. 11, a perspective view 1100 of a position lockout switch 120 for the suspended seat apparatus 105 is shown in accordance with an embodiment. In one embodiment, the lock out switch 120 is optional. In general, by including lock out switch 120, the suspension within seat base 110 will be "turned off". For example, in the event that seat base 110 suspension is not needed, the user will manually activate lock out switch 120 integrated into the air shocks to deactivate/minimize the seats suspension travel. In one embodiment, this setting is obtained by manipulating lock out switch 120 which is attached to seat base 110. In one embodiment, lock out switch 120 will have a tactile feedback so that the user will easily know what setting suspended seat apparatus with damping seat structure 100 is in without having to look for the position of lock out switch 120.

Figure 12:
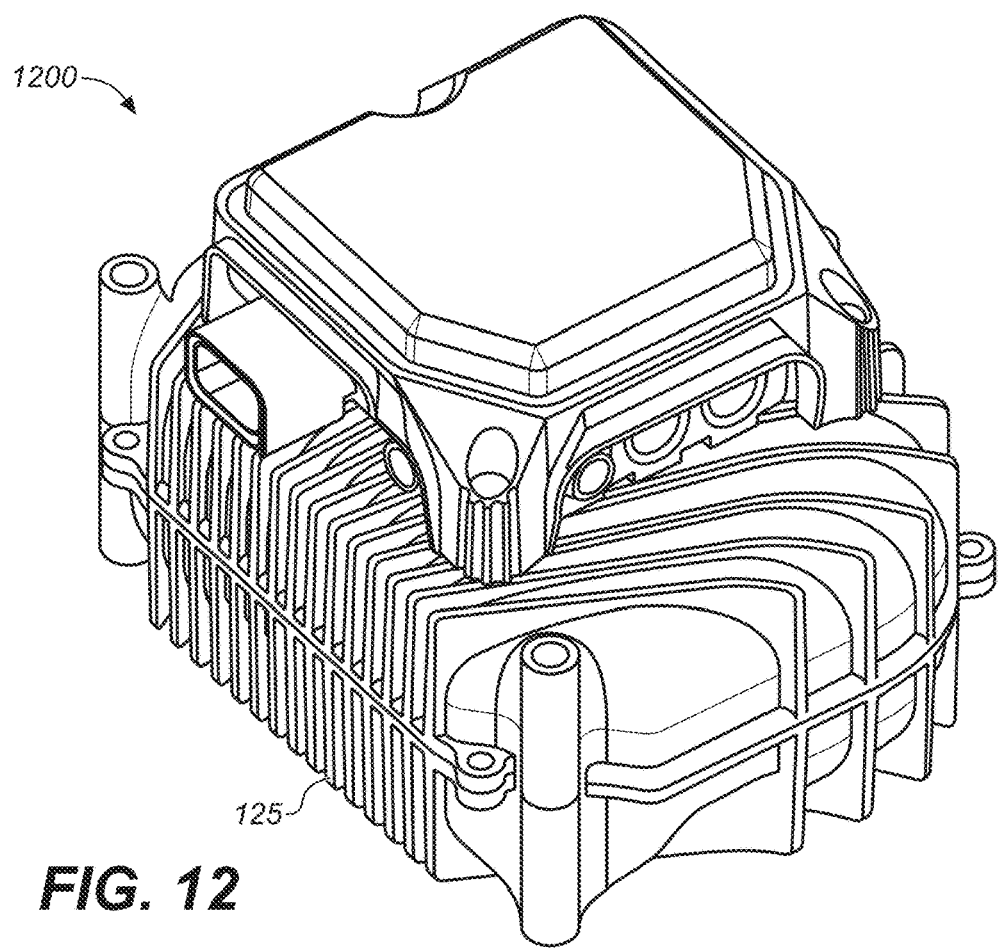
FIG. 12 is a perspective view of a compressor and controller automatic adjuster for the suspended seat apparatus, in accordance with an embodiment.

Referring now to FIG. 12, a perspective view 1200 of a compressor and controller automatic adjuster 125 for the suspended seat apparatus 105 is shown in accordance with an embodiment. In one embodiment, compressor and controller automatic adjuster 125 is optional. In one embodiment, compressor and controller automatic adjuster 125 will be added to control the spring pressure automatically with the use of an onboard monitoring system. This system determines the optimal spring pressure for the passenger based on an optimum seat height base requirement for the damping system to be fully effective. In one embodiment, compressor and controller automatic adjuster 125 has an integrated accelerometer which aids in the bleed off of pressure during high impact scenarios to reduce unwanted spinal loads and g-forces.

In one embodiment, rough bottoming out will be prevented by using rubber bump stops or cantilever assembly 112 will be tailored to utilize the end of the air spring stroke which is where the highest spring pressure will be found.

With reference again to FIG. 1, the seat 140 suspension characteristics will be set at the factory, manually adjustable by a user, or automatically adjustable by a computing device using environmental inputs and the like. For example, the design and operation including the rigidity of the seat 140 will be for a terrain type, ocean type, or the like, versus a rider comfort design. As such, the suspension seat will provide an additional layer of mechanical suspension that is missing in vehicles, such as, personal watercraft, boats, and the like.

For example, in an automobile suspension system, the different aspects that are used to adjust a suspension include tires, shocks, springs, axles, tension bars, and the like. Moreover, within each different aspect numerous modifications will be made both automatically and manually. For example, changes to tire components will include tire type, e.g., rigidity, wall height, level of inflation, how it is mounted to the rim, etc. Similarly, shocks are wide ranging in size, range of operation, dampers, reservoirs, fluid type, tuning, and the like, which are modifiable either automatically or manually to different performance characteristics or for operation in different environments. Springs are of different lengths, thicknesses, spring constants, materials; axles are solid or independent, etc. Thus, the possible different adjustable characteristics to the suspension of a wheeled vehicle will be almost infinite and the ongoing developments and inventions in the suspension field show that significant time, resources and effort are being used to constantly develop better suspension systems.

Here, embodiments provide a novel seat suspension that is built into the seat manufacturing process and provides a seat 140 level of suspension for reducing the forces and vibrations transferred from a vehicle to the person riding in the seat 140. In general, the seat suspension is manufactured to provide a certain fixed level suspension characteristic or to variable level suspension characteristics. For example, the suspension characteristics are manually or automatically adjustable based on user preference, speed, maneuvering, or the like.

In one embodiment, seat 140 will also include comfort characteristics such as: seat warmers, coolers, airflow fans, and the like. Thus, while seat 140 is used as another layer of suspension to the overall vehicle ride, it is possible, in an embodiment, to incorporate creature comforts into the seat 140 design.

Figure 13:
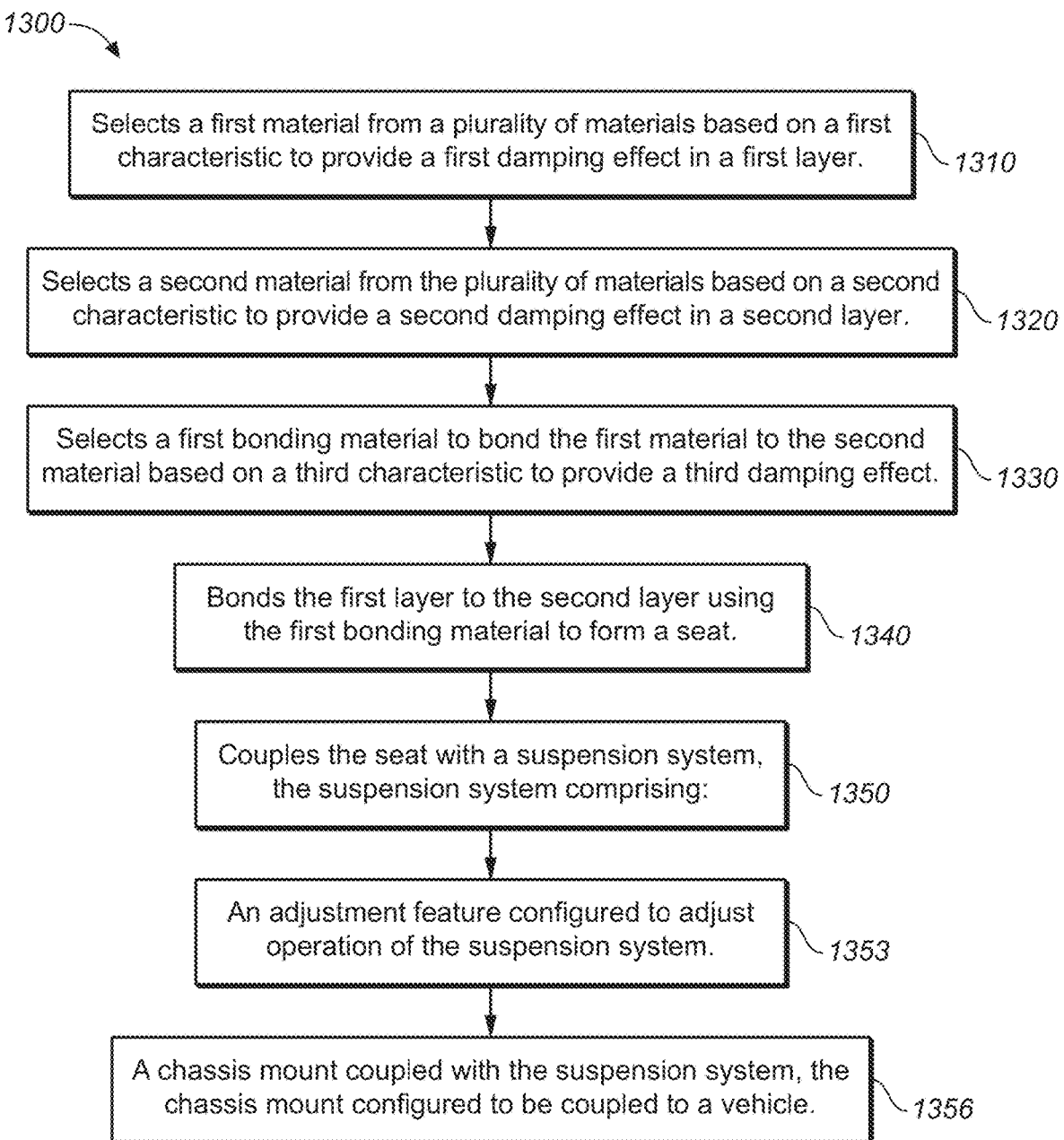
FIG. 13 is a flow chart of a method for manufacturing a damping seat structure having at least two layers in accordance with an embodiment.

With reference now to FIG. 13, a flow chart 1300 of a method for manufacturing a damping structure for seat 140 having at least two layers (such as layers 1401-140n of FIG. 14, and/or layers 1501-150n of FIGS. 15 and 16) is shown in accordance with an embodiment.

Figure 15:
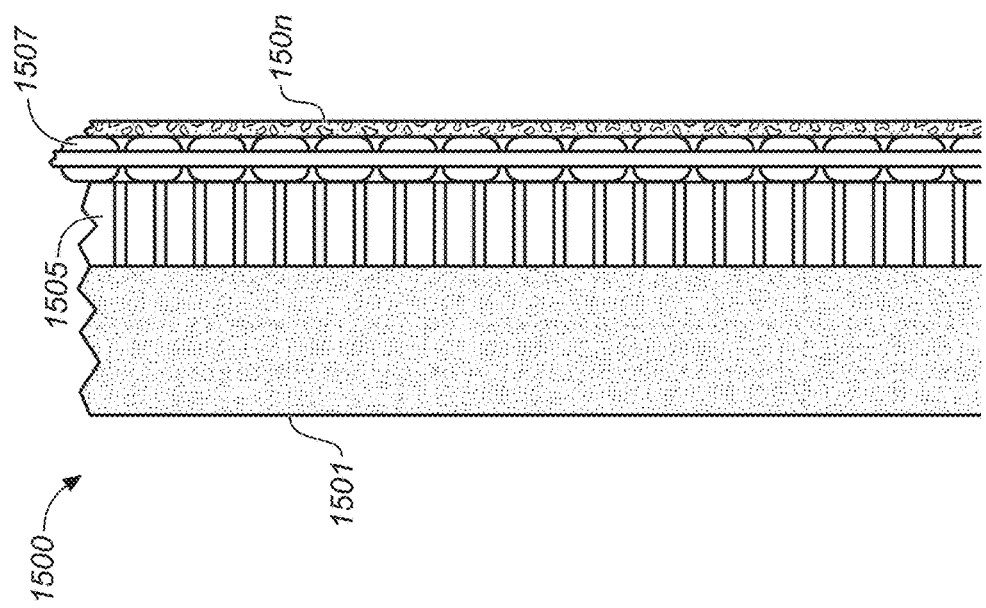
FIG. 15 is a cutaway side view of a damping seat structure having a plurality of layers, in accordance with an embodiment.
Figure 16:
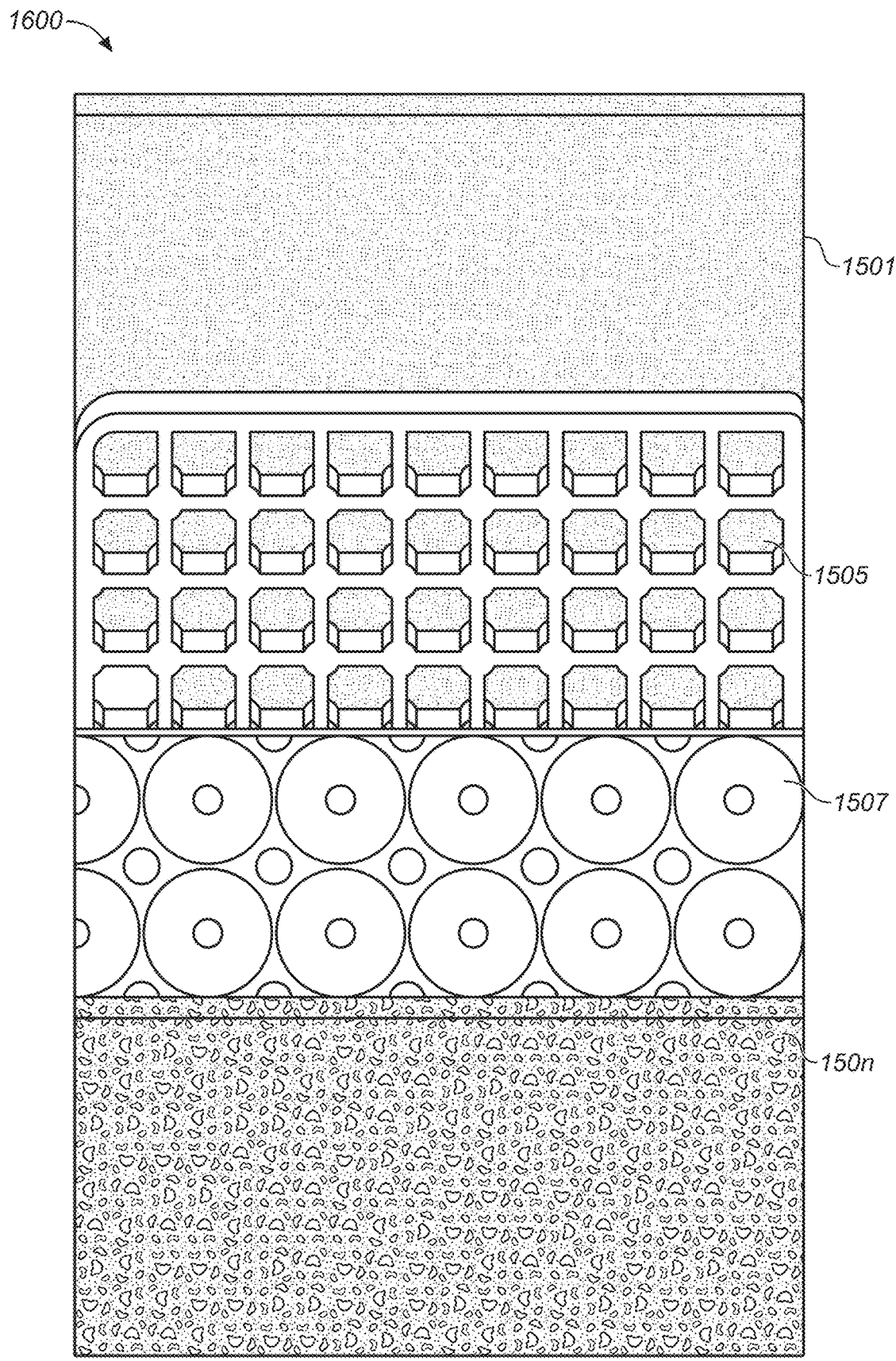
FIG. 16 is a cutaway front view of a damping seat structure having a plurality of layers, in accordance with an embodiment.

With reference now to 1310 of FIG. 13 and FIGS. 15-16, one embodiment selects a first material from a plurality of materials based on a first characteristic to provide a first damping effect in a first layer 1501.

With reference now to 1320 of FIG. 13 and FIGS. 15-16, one embodiment selects a second material from the plurality of materials based on a second characteristic to provide a second damping effect in a second layer 1505. Further, in one embodiment, at least one side of at least one of the first material and the second material is treated to alter a surface characteristic of the at least one side to provide a fourth damping effect. Additionally, the first material and/or the second material are selected from a plurality of piezoelectric materials.

With reference now to 1330 of FIG. 13 and FIGS. 15-16, one embodiment selects a first bonding material to bond the first material to the second material based on a third characteristic to provide a third damping effect.

With reference now to 1340 of FIG. 13 and FIGS. 15-16, one embodiment bonds first layer 1501 to the second layer 1505 using the first bonding material to form a seat.

With reference now to 1350 of FIG. 13 and to FIGS. 1-12, one embodiment couples the seat 140 with a suspension system 105. As described in detail herein.

With reference now to 1353 of FIG. 13 and to FIGS. 4-12, in one embodiment suspension system 105 includes an adjustment feature (such as one or more of adjustment features 112-117, 120 and 125 of FIGS. 2-12) configured to adjust operation of the suspension system 105.

With reference now to 1356 of FIG. 13 and to FIG. 3, in one embodiment suspension system 105 includes a chassis mount 111 coupled with the suspension system, the chassis mount configured to be coupled to a vehicle. For example, in one embodiment, chassis mount 111 provides a solid attachment point between the seat system and the vehicle body pan.

Figure 14:
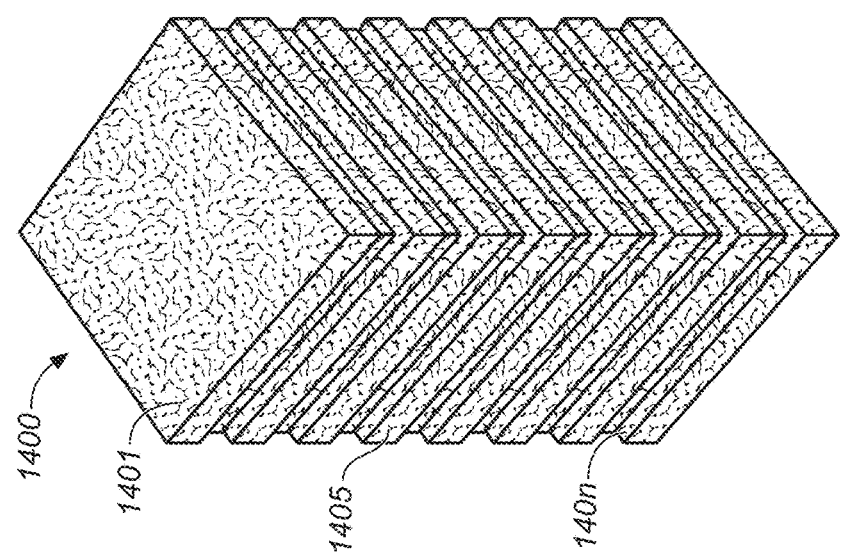
FIG. 14 is an exploded view of a damping seat structure having a plurality of layers, in accordance with an embodiment.

In a stack having additional layers as shown in FIGS. 14-16, one embodiment selects a third material from a plurality of materials having a pneumatic chamber therein to provide a fourth damping effect in a third layer 1507 and the third layer 1507 is bonded with one or both of the first layer 1501 or the second layer 1505. Similarly, a third material is selected from a plurality of hydraulic materials based on a third characteristic to provide a fourth damping effect in a third layer 1507 and the third layer 1507 is bonded with one or both of the first layer 1501 or the second layer 1505.

In a stack having even more additional layers, a third material is selected from a plurality of materials having a pneumatic chamber therein to provide a fourth damping effect in a third layer 1507 and a fourth material is selected from a plurality of hydraulic materials based on a fourth characteristic to provide a fifth damping effect in a fourth layer 150n. The third layer 1507 and the fourth layer 150n are then bonded with one or both of the first layer 1501 or the second layer 1505.

In one embodiment, the adjustable damping characteristic is manually adjustable via a user input. For example, as described in further detail in the discussion of FIG. 14, the adjustable damping characteristic will be automatically adjusted based on external conditions, e.g., sensors detecting shock, vibration, or the like. Moreover, the sensors are monitoring the vehicle, the seat, another mechanical component, or even the passenger in the seat 140 on the vehicle.

Referring now to FIG. 14, an exploded view of a damping stack 1400, e.g., such as used to make seat 140, having a plurality of layers 1401-140n is shown in accordance with an embodiment. In one embodiment, the damping structure is a stratified viscoelastic materials damping stack. Moreover, the materials in the damping stack 1400 will be individually and jointly combined based on the material variables such as, but not limited to, chemical composition, layer thickness, surface mapping characteristics, bonding composition and thickness, center frequency damped, coefficient of damping, spring back rate, and the like.

As shown in FIG. 14 and described in more detail herein, material and adhesive layers will be stacked in a way that mimics a valve shim stack of a damper piston or base valve. Thus, a layered seat cushion could be "tuned" by choosing the right layering of materials for a given application. Different layers for high frequency vibration, low speed compression, and high speed compression are discussed. In one embodiment, electronically altered materials, anisotropic materials, piezoelectric materials, pneumatic materials, hydraulic materials, and the like are incorporated depending upon the use scenario.

For example, by varying the chemical composition of the viscoelastic materials, the order of the viscoelastic material within damping stack 1400, the surface characteristic of each layer, and/or the bonding modality serving to unify the stack, the damping curve and damped frequencies of the combined structure is tailored to provide specific or variable damping characteristics.

Further, the materials of damping stack 1400 is engineered to operate in a specific frequency domain, demonstrate predictable stress/strain slopes at a given strain rate, or embody varying recovery times after removal of the excitation or strain. When these dissimilar materials are bonded into a stratified structure, e.g., seat 140, damping occurs through a combination of independent as well as dependent compression, material rebound and energy absorption characteristics. The composition of the damping stack 1400 is tailored to observed or anticipated peak shock amplitudes, excitation center frequencies, as well as sprung and unsprung masses.

In one embodiment, the viscoelastic materials damping stack 1400 includes a plurality of materials having varying chemical or metallurgical composition. The materials include a plurality of damping center frequencies as well as a plurality of stress/strain characteristics embodied therein. The damping stack 1400 will have a plurality of surface characteristics engineered into each layer as well as the option for a plurality of bonding alternatives for each stratum. Moreover, in one embodiment, damping stack 1400 includes a plurality of joint or co-occurring damping characteristics dependent on materials selected, stack sequence, and the like.

For example, one or more of the layers in damping stack 1400 includes foam of different density, thickness, or the like. Moreover, a cover is provided around damping stack 1400 to provide the seat surface. The cover will be a waterproof material such as neoprene, a gripping material that gets stickier as it gets wet, a material with a high level of durability and resistance to abrasions and tears such as nylon or rayon, a hardy material using a Kevlar fiber, or the like.

In one embodiment, one or more of the layers in damping stack 1400 include isotropic materials that have identical values in all directions. Similarly, in one embodiment, one or more of the layers in damping stack 1400 include anisotropic materials that have values that change with direction along the object. For example, with the grain movement and characteristics versus against the grain movement and characteristics.

By stacking and organizing layers that are anisotropic, forces in a first direction would be absorbed or damped, while forces in a direction perpendicular to the first direction would not be. For example, orientation of the anisotropic layers could be oriented to absorb a pitching moment force while remaining rigid for roll or yaw moment forces. Similarly, the orientation of the anisotropic layers could be oriented to absorb roll or yaw forces while remaining rigid for pitch and the other of roll or yaw forces.

In one embodiment, one or more of the layers in damping stack 1400 include piezoelectric materials to create electricity that will then be used on electroactive materials. In one embodiment, a layer is filled with an electrorheological fluid that will change viscosity as an electric field is applied. As electricity is applied the viscosity would become thicker and as such the electrorheological fluid filled layer would become more solid.

As such, in a smooth operating environment, an electric field is user selected, e.g., a smooth surface setting, or automatically applied by a sensor on the vehicle, to the electrorheological fluid layer to increase firmness in the ride. In contrast, when rougher terrain is encountered, the user will select a rough terrain setting, or the automatic sensor would sense the rough terrain and reduce the electric field thereby making the electrorheological fluid layer softer and more absorptive of vibrations and shocks.

In one embodiment, one or more of the layers in damping stack 1400 includes pneumatic materials, such as an air bladder layer, or the like. In a similar operation as to the electrorheological fluid discussed above, the pneumatic layer could be manually or automatically inflated or deflated depending upon the surface conditions being encountered. On smooth terrain, the pneumatic layer could be increased in inflation to provide additional hardness that would increase feedback, feel and precise handling.

In rougher terrain, the pneumatic layer could be deflated to provide a softer ride that would reduce rider felt vibrations, shock, bumps, and the like thereby reducing rider fatigue. As described herein, the manual option is a user selectable switch for given characteristics, e.g., highway mode—for smooth terrain, -off-road mode—for rough terrain, a mixed mode for intermediate terrain, etc.

In an automated mode, a sensor on the vehicle monitor the shock, vibrations, bumps and the like and automatically adjust the pneumatic layer based on the sensed characteristics. In a fully manual mode, the user will use a valve and pump, or the like, to add or relieve pressure from the pneumatic layer based on user preference, or the like.

In one embodiment, one or more of the layers in damping stack 1400 includes hydraulic materials, such as gel materials, silicon filled, or the like. In one embodiment, the hydraulic material layer is factory set at a specific firmness. For example, a seat 140 is manufactured with a first type of hydraulic material layer and be designated as a highway seat. While another seat 140 is manufactured with a second more or less firm type of hydraulic material layer and be designated as rough terrain seat.

In general, by utilizing different layers of different material types, such as described herein, a damping stack 1400 will be built into a seat 140 that is tuned to meet specific damping characteristics such as highway, offroad, mixed terrain, rock climbing, racing, performance, or the like.

Similarly, by providing different bonding characteristics between the layers 1401-140*n*, the force vectors, directions of absorption, and other characteristics of seat 140 will be further adjusted to provide additional and directional damping characteristics.

Moreover, utilizing adjustable layers within the damping stack 1400 will allow a seat 140 to be adjusted on the fly either automatically or manually. For example, a user will start in highway mode during travel down a roadway, e.g., a damping stack 1400 with a firmer feel, and then as the user transitions to rougher terrain, the adjustable layers within the damping stack 1400 will be adjusted to provide a smoother ride by increasing absorption of shock.

In one embodiment, the automated or user selectable settings are further defined based on actual conditions or as "learned" user settings. For example, a user will put the seat 140 into a rough terrain mode and then transition it to a roadway, fire road, highway, or the like. When the sensors determine that the seat is not receiving as much shock as is needed for rough terrain, the sensor would change the mode to highway mode to provide a firmer ride. Additionally, if a user prefers a harder feel, the user would set the adjustments so that off-road mode reduces less shock and provides less damping. Similarly, if the user prefers a softer ride, or has been in the seat for a long period of time, the user would adjust the stiffness mode to be a softer seat, provide a smoother ride, or the like.

Thus, by using the damping stack 1400 to provide user adjustable stiffness and shock absorbing characteristics, the users comfort is increased while the fatigue from constant shocks will be reduced.

Although the discussion has focused on an automobile, the seat 140 damping characteristics are available for other applications such as snowmobiles, track vehicles, watercraft, and even fully suspended vehicles to provide an additional layer of shock absorption and vibration damping.

Figure 17:
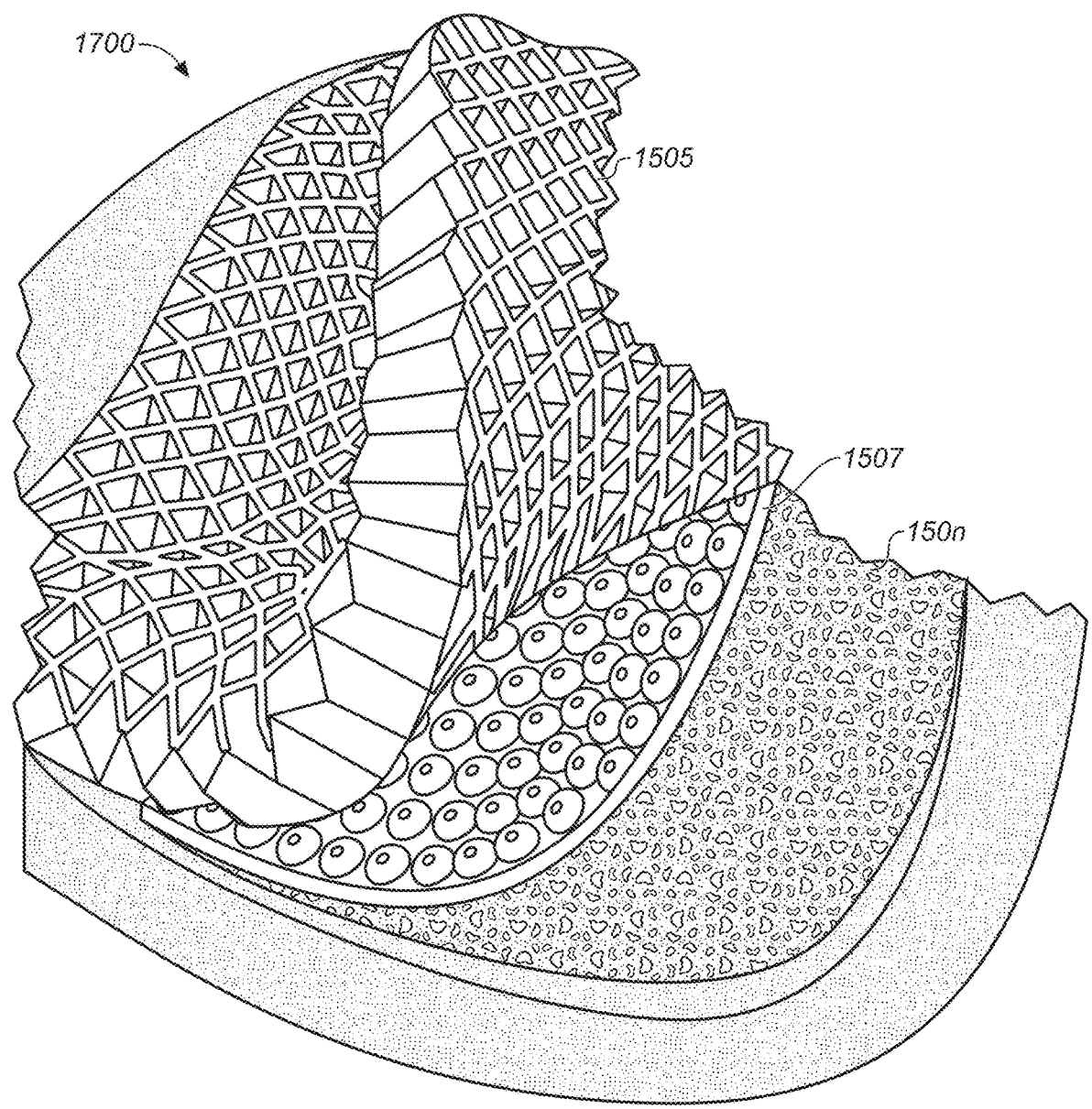
FIG. 17 is a top spread view of a damping seat structure having a plurality of layers, in accordance with an embodiment.

FIG. 15 is a cutaway side view 1500 of a damping seat structure having a plurality of layers shown in accordance with an embodiment. The layers, connections, characteristics, capabilities, and materials used in FIGS. 15-17 are similar to those described in FIG. 14. As such, the discussion of FIG. 14 is referred to herein in its entirety and not repeated in detail for purposes of clarity.

FIG. 15 includes a first layer 1501, a second layer 1505, a third layer 1507, and a fourth layer 150*n*. Although four layers are shown, it should be appreciated that there may be more or fewer layers. The use of four herein is merely for purposes of brevity and clarity. In one embodiment, first layer 1501 is a rigid foam; second layer 1505 is a pliable foam/rubber/neoprene layer with a number of geometric shapes that form air pockets while maintaining the structure; third layer 1507 is a pliable foam/rubber/gel/neoprene layer with a plurality of shock absorbing bumps therein; fourth layer 150*n* is a pliable foam/rubber/gel/neoprene layer that is smooth but provides an additional amount of shock absorption and a relatively flat surface that could be used as the top or almost top layer of the seat.

It is also possible that one of more of the layers 1501-150*n* are gel filed or are adjustable based on an electronic pulse sent through the material to cause changes to the layer's frequency damping characteristics, rigidity, and the like.

In one embodiment, one or more of layers 1501-150*n* include hydraulic materials, such as gel materials, silicon filled, or the like. In one embodiment, one or more of layers 1501-150*n* could be a pneumatic layer which would be inflated or deflated. For example, it may be inflated to provide a firmer ride, and then deflated to provide a softer ride that would reduce rider felt vibrations, shock, bumps, and the like thereby reducing rider fatigue.

In one embodiment, one or more of layers 1501-150*n* include piezoelectric materials to create electricity that will then be used on electroactive materials. In one embodiment, one or more of layers 1501-150*n* are filled with an electrorheological fluid that will change viscosity as an electric field is applied. As electricity is applied the viscosity would become thicker and as such the electrorheological fluid filled layer would become more solid.

In one embodiment, one or more of layers 1501-150*n* include isotropic materials that have identical values in all directions. Similarly, in one embodiment, one or more of the layers in damping stack 1400 include anisotropic materials FIG. 16 is a cutaway front view 1600 of a damping seat structure having a plurality of layers shown in accordance with an embodiment. Cutaway front view 1600 consists of the same layers as shown in FIG. 15, e.g., first layer 1501, second layer 1505, third layer 1507, and fourth layer 150*n*. Although four layers are shown, it should be appreciated that there may be more or fewer layers. The use of four herein is merely for purposes of brevity and clarity.

FIG. 17 is a top spread view 1700 of a damping seat structure having a plurality of layers shown in accordance with an embodiment. Spread view 1700 consists of similar layers as shown in FIGS. 15 and 16, e.g., second layer 1505, third layer 1507, and fourth layer 150*n*. Although three layers are shown, it should be appreciated that there may be more or fewer layers. The use of three herein is merely for purposes of brevity and clarity.

It should be noted that any of the features disclosed herein are useful alone or in any suitable combination. While the foregoing is directed to embodiments of the present invention, other and further embodiments of the invention is implemented without departing from the scope of the invention and the scope thereof is determined by the claims that follow.

What we claim is:

1. An adjustable damping seat structure comprising:
    a first material of a plurality of materials having a first characteristic to provide a first damping effect in a first layer;
    a second material of the plurality of materials based on a second characteristic to provide a second damping effect in a second layer;
        the first material or the second material having an adjustable damping characteristic, said first material or said second material selected from a plurality of piezoelectric materials; and
    a first bonding material to bond the first material to the second material based on a third characteristic to provide a third damping effect,
        the first layer bonded to the second layer using the first bonding material;
    a third material from a plurality of materials having a pneumatic chamber therein to provide a fourth damping effect in a third layer; and
    a fourth material from a plurality of hydraulic materials based on a fourth characteristic to provide a fifth damping effect in a fourth layer,
        the third layer and the fourth layer bonded with the first layer or the second layer.

2. The adjustable damping seat structure of claim 1, further comprising:
    at least one side of at least one of the first material and the second material being treated to alter a surface characteristic of the at least one side to affect said first damping effect.

3. The adjustable damping seat structure of claim 1, wherein the adjustable damping characteristic is manually adjustable via a user input.

4. The adjustable damping seat structure of claim 1, wherein the adjustable damping characteristic is automatically adjusted based on external conditions.

5. The adjustable damping seat structure of claim 4, wherein said external conditions are selected from the group consisting of: sensors detecting shock, vibration, sensors monitoring a vehicle, sensors monitoring said seat, sensors monitoring a mechanical component, and sensors monitoring a passenger in said seat.

6. The adjustable damping seat structure of claim 1 further comprising:
    an adjustment feature which is controlled based on input from a vehicle monitoring system.

7. The adjustable damping seat structure of claim 1 further comprising:
    a chassis mount configured to be coupled to a vehicle.

8. The adjustable damping seat structure of claim 1, wherein at least two of said first layer, said second layer, said third layer and said fourth layer are combined based on material variables selected from the group consisting of: chemical composition, layer thickness, surface mapping characteristics, bonding composition and thickness, center frequency damped, coefficient of damping, and spring back rate.

* * * * *